No. 719,171. PATENTED JAN. 27, 1903.
H. AUSTIN.
STEERING MECHANISM FOR MOTOR VEHICLES.
APPLICATION FILED APR. 23, 1902.
NO MODEL.

WITNESSES
INVENTOR
Herbert Austin
By Henry Connett
Attorney.

THE NORRIS PETERS CO., PHOTO-LITHO., WASHINGTON, D. C.

UNITED STATES PATENT OFFICE.

HERBERT AUSTIN, OF ERDINGTON, NEAR BIRMINGHAM, ENGLAND.

STEERING MECHANISM FOR MOTOR-VEHICLES.

SPECIFICATION forming part of Letters Patent No. 719,171, dated January 27, 1903.

Application filed April 23, 1902. Serial No. 104,411. (No model.)

*To all whom it may concern:*

Be it known that I, HERBERT AUSTIN, engineer, a subject of the King of Great Britain, residing at Erdington, near Birmingham, England, have invented certain new and useful Improvements in the Steering Mechanism of Motor-Cars, of which the following is a specification.

This invention relates to the steering mechanism of wheels of motor-cars, which, as is the common practice, are mounted upon short arms, which are pivotally connected with the ends of a fixed front axle and are steered through the medium of rods, which are connected with the outer ends of arms which form, with the arms upon which the wheels are mounted, bell-cranks. The steering mechanism usually or frequently employed in this connection has a steering-spindle mounted in a bracket which is rigid with the framing of the car, and the turning movement of the steering-spindle is transmitted, through the medium of a rod, to an arm which turns about a vertical axis, which is rigid with the fixed front axle, and the turning movement of this arm is transmitted to the wheels. Such mechanism is subject to the disadvantage that considerable endwise force is exerted (while steering) through the joints of the mechanism, which are between the steering-spindle and the arm which turns about the axis, which is rigid with the fixed front axle, and has the further disadvantage that the action of the springs under the vibration of the traffic constantly alters the inclination of the rod, through the medium of which the arm last mentioned is turned by the steering-spindle, with the result that the steering-wheels are constantly being moved as to their angular positions in relation to the fixed front axle, even though the steering-spindle is kept from turning.

One of the chief objects of the present invention is to obviate the inconveniences noted above in a motor car or vehicle having an axially-rotative steering-spindle operating through gear-wheels mounted on the framing of the car, and this is accomplished by coupling said gearing through automatically-connecting means with the locking portion of the mechanism carried on the fixed front axle of the vehicle, as will be hereinafter more fully described.

The invention is illustrated by the drawings herewith, of which—

Figure 1:
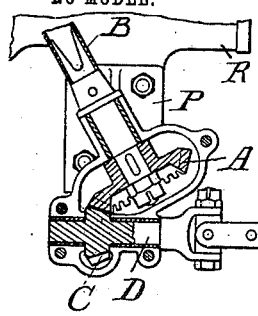
Figure 4:
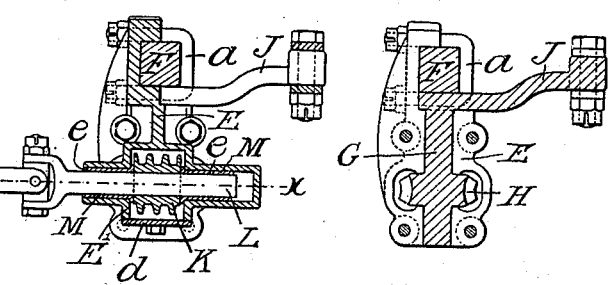
Figure 6:
Figure 2:
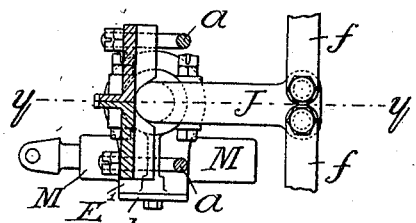
Figure 3:
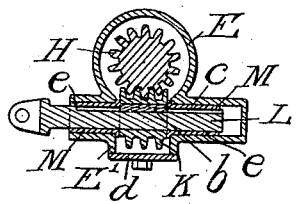
Figure 5:
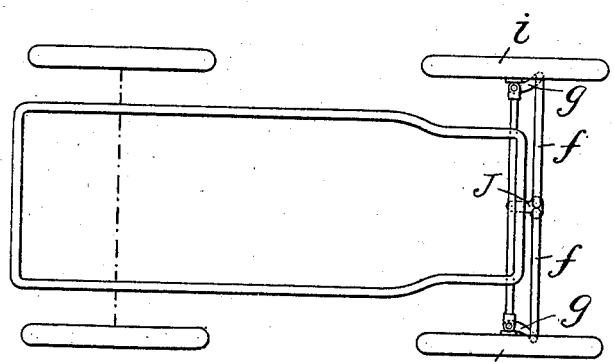

Figure 1 is a longitudinal section through the mechanism, but shows the lower end only of the steering-spindle. Fig. 2 is a plan, partly in section, of the portion of the mechanism shown at the right-hand end of Fig. 1. Fig. 3 is a sectional plan of such portion, taken in the plane indicated by line $x\,x$ of Fig. 1. Fig. 4 is a vertical section taken in the plane indicated by line $y\,y$ of Fig. 2. Fig. 5 is a skeleton plan, to a reduced scale, of the framing of the car and of the wheels, showing parts of the steering mechanism not shown by the other views; and Fig. 6 is a plan view of a telescopic connection between portions of the mechanism which may be used by way of modification.

A bevel-wheel A is fixed on the lower end of the inclined steering-spindle B and gears with a bevel-wheel C of a spindle D. The bevel-wheel C is constructed as a pinion—that is to say, is of less diameter than the wheel A—for a purpose which will be presently shown. The bracket P, which carries the lower end of the steering-spindle and the spindle D, is fixed to a portion of the framing R of the motor.

A housing E is fixed, by means of clips $a$, to the fixed front axle F, to the ends of which the arms upon which the wheels are mounted are pivoted. A vertical spindle G is capable of partially rotating within this housing and carries near its lower end a worm-wheel H, which is inclosed within the housing, and carries at its upper end an arm J, which projects forward through an open portion of the housing. It is preferred to form the worm-wheel and arm integral with the spindle, in which case the housing E is formed in halves vertically to enable the spindle to be placed therein, and the halves are bolted together, as shown. Within a sideway branch E' of the housing E is placed a worm K, by which the worm-wheel H is operated, and the spindle L of this worm is carried in bearings M, which project from opposite sides, respectively, of the branch E'. The hinder end of this spindle is connected, through the medium of a universal joint, with a rod N, which is similarly connected with the forward end of the spindle D. The spindle L is capable of sliding through the worm K, but drives such worm through the medium of a key or feather *b* of the worm, which is a sliding fit within a groove *c* of the spindle, and thus if the relative positions of the axle F and steering-spindle B alter, as they are liable to do in the running of the car, owing to the action of the springs under vibration in traveling, the spindle L merely slides somewhat through the worm K, and no strain, therefore, is thrown upon the steering mechanism in consequence, and as the spindle G is locked by the worm K such spindle cannot turn unless the worm itself is turned. The worm, however, has no tendency to be turned as a result of the action of the springs, and therefore such action has no tendency to alter the steering. The worm itself is of course kept in position sidewise by shoulders of the housing. An opening, which is normally covered by a plate *d*, is formed through the outer end of the branch E' of the housing E for the insertion and removal of the worm K and also of bushes *e*, which form the bearings for the spindle L.

The arm J is connected at its outer end by means of links *f* with the arms *g*, (see Fig. 5,) which directly operate the arms upon which the steering-wheels *i* are mounted.

It will be observed that even if the worm K were not slidingly mounted upon the spindle L the actual steering apart from alterations in the relative positions of the axle F and steering-spindle B would involve no endway thrust upon the connections between the spindle D and spindle L.

The purpose of making the wheel C smaller than the wheel A is to gear up the spindle D in compensation for the gearing down between the spindle L and spindle G, so that the steering may be effected, as is usual, without having to turn the spindle B through a whole revolution.

In lieu of forming the spindle L to be capable of sliding through the worm K it may be rigid therewith and a rod N' (see Fig. 6) be substituted for the rod N. This rod N' is formed in two parts *k l*, of which the part *k* is a sliding fit endwise within the part *l*, but is prevented from turning in relation thereto, such as by a feather-key *m* of the one part, which can slide along a key-groove *n* of the other part.

Having fully described my invention, what I claim, and desire to secure by Letters Patent, is—

1. In a steering mechanism for a motor car or vehicle, the combination with a steering-spindle mounted to rotate axially in a part which is rigid with the framing of the vehicle, and the said part, of locking mechanism carried by the fixed axle of the vehicle, gearing operated by rotation of said spindle, adjustable connecting means between the said gearing and the locking means, whereby the latter is operated from the spindle, and means intermediate the steering-wheels of the vehicle and said locking mechanism for operating said wheels.

2. In a steering mechanism for a motor car or vehicle, the combination with a steering-spindle carried by the framing of the vehicle and rotatable axially, and gearing operatively connected with said spindle, of locking mechanism carried by the fixed axle of the vehicle, means between said locking mechanism and the steering-wheels of the vehicle for operating the latter, and connecting means between said gearing and said locking means whereby the former actuates the latter, said means comprising a telescopic shaft composed of two splined sections, and universal joints coupling the ends of said shaft respectively with said gearing and said locking mechanism.

3. In steering mechanism for a motor-car, the combination of a steering-spindle, a worm which is kept in position sidewise by abutments fixed to the front axle, a worm-wheel which meshes with said worm, a spindle of such wheel and an arm carried thereby, means by which the turning of the steering-spindle turns also the worm, and connections between the arm of the worm-wheel spindle and bell-cranks on arms of which the steering-wheels are mounted, all substantially as set forth.

4. In steering mechanism for a motor-car, the combination of a steering-spindle, a worm which is kept in position sidewise by abutments fixed to the front axle, a spindle upon which the worm is slidingly mounted, means which insure that the worm will turn with its spindle, a worm-wheel which meshes with the worm, means by which the worm-spindle is turned by the steering-spindle, and means by which the turning of the worm-wheel alters the positions of the steering-wheels, substantially as set forth.

5. In steering mechanism for a motor-car, the combination of a steering-spindle, a bevel-wheel on the end of such spindle, a wheel of smaller diameter with which such bevel-wheel meshes, a spindle which is rigid with such wheel of smaller diameter, a worm which is kept in position sidewise by abutments fixed to the front axle, a spindle of such worm, a rod which connects at one end by a universal joint with the forward end of the spindle which carries the wheel of smaller diameter, and at the other end by a universal joint with the rear end of the worm-spindle, a worm-wheel which meshes with the worm and means by which the turning of the worm-wheel alters the positions of the steering-wheels, substantially as set forth.

6. In a steering mechanism for a motor car or vehicle, the combination with a steering-spindle mounted to rotate axially in a part which is rigid with the framing of the vehicle, and the said part, of a locking mechanism carried by the fixed axle and comprising a worm and worm-wheel, gearing operated by the rotation of said spindle, adjustable connecting means between said gearing and the locking means, whereby the latter is operated from the spindle, an operating-arm J, integral with the worm-wheel of the locking means, and means intermediate the steering-wheels of the vehicle and the said arm J for operating said wheels through the latter.

In witness whereof I have hereunto signed my name, this 8th day of April, 1902, in the presence of two subscribing witnesses.

HERBERT AUSTIN.

Witnesses:
ROBERT G. GROVES,
THOMAS EDWIN CARLESS.